Feb. 2, 1926.  
W. E. YOUNG  
RUNNERED WAGON  
Filed May 22, 1923
1,571,880
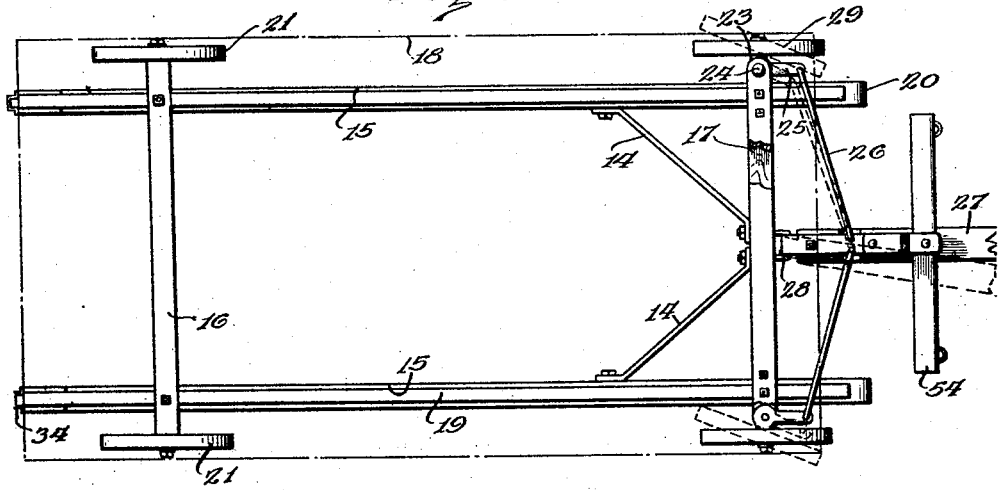
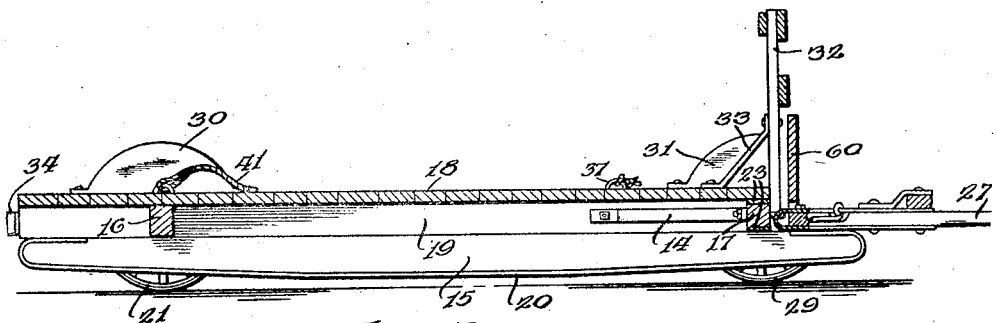
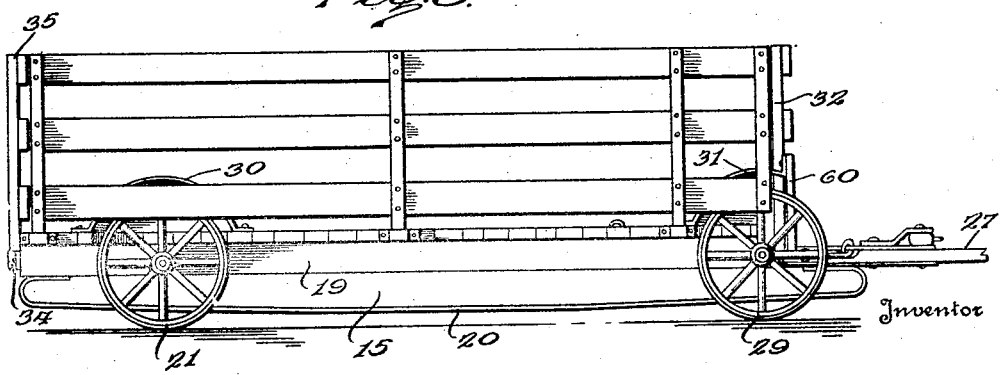
Inventor  
W. E. Young  
By Lacey Lacey, Attorney Patented Feb. 2, 1926.

1,571,880

UNITED STATES PATENT OFFICE.

WILBER E. YOUNG, OF GORDON, NEBRASKA.

RUNNERED WAGON.

Application filed May 22, 1923. Serial No. 640,729.

*To all whom it may concern:*

Be it known that I, WILBER E. YOUNG, a citizen of the United States, residing at Gordon, in the county of Sheridan and State of Nebraska, have invented certain new and useful Improvements in Runnered Wagons, of which the following is a specification.

My invention relates to a vehicle, and the main object of the invention is to provide a farmer's wagon used for the transportation of hay, straw, corn stalks and the like, which is adapted to travel equally well on hard or soft ground. In other words, the wagon is provided both with wheels and sled runners, which makes it possible to transport a heavy load easily over hard roads as well as soft meadows. Accordingly this wagon would never be stuck in the mud or in marshes.

Another object of the invention is to build the floor of the wagon practically direct upon the wheel axles, thereby making the wagon floor very low in order to facilitate the loading. For this reason, the wagon wheels project above the floor and the front wheels do not turn beneath the same as is usual with vehicles of this character. This has also the advantage that the wheels may be made larger than on ordinary wagons.

Another object of the invention is to construct the wagon with fixed front and rear axles instead of having the front axle turning on a king pin. The axle arms of the front axle are therefore mounted in the manner of automobile axles, that is to say, with journal bearings at the ends of the axle for the axle arms, the latter being connected to the pole or tongue so as to turn with the latter in horizontal direction.

In the accompanying drawings one embodiment of the invention is illustrated; and—

Figure 1 is a top plan view of the wagon with the floor removed;

Figure 2 is a central longitudinal section thereof;

Figure 3 is a side elevation of the wagon with racks.

Referring particularly to the drawings, the wagon comprises a frame formed of side beams 15, to which are rigidly secured as by bolts or the like, the rear axletree 16 and the front axletree 17. As clearly shown the axles are placed on top of the longitudinal side beams 15, and in order to mount the floor 18 level with the top of the axles, filling boards 19 of the same height as the axles are inserted between the beams 15 on the under side of the floor 18 along the entire length of the latter. A suitable size for the floor is ten feet wide and twenty feet long. Between the axletree 17 and the side beams 15 is preferably provided a pair of iron braces 14 suitably bolted or riveted to the axle and the beams, as best seen in Figure 1.

The under side of each beam 15 is slightly curved or tapered towards each end from its greatest depth near the middle of the wagon. The under side of each beam is provided with a steel or iron shoe 20 forming the runners for the vehicle. By tapering the runners towards each end thereof, when the wheels are detached and the vehicle sliding along on the runners, it will be easy to turn the same around on snow or ice, as it will turn practically on two points under the runners instead of on the entire length thereof.

The rear axletree is formed with fixed spindles for carrying the rear wheels 21 in the ordinary manner while the front axletree 17 has short spindles pivoted in suitable bearings 23 on journals 24 in the manner of automobile axles. The bearings 23 preferably consist of a pair of flat bands or plates running the entire length of the axletree 17, at top and bottom thereof, see Figures 1 and 2. These axle arms or spindles have forwardly directed stubs 25 connected by means of links 26 to the wagon pole 27 which is journaled in the usual manner, as at 28, to the front axle 17. When the team turns, the front wheels 29 will then be compelled to turn substantially the same angle in the horizontal plane as the pole 27.

The wagon wheels are preferably set-in a short distance from the side edges of the floor 18, as indicated in Figure 1, and over each wheel is secured a hood 30 and 31 respectively. The hoods 30 for the rear wheels are considerably narrower than the hoods for the front wheels, this greater width of the front hoods permitting the horizontal turning of the wheels under the same. These hoods 30 and 31 are secured on top of the floor 18, as best seen in Figure 2.

At the front end of the floor is permanently secured a dash board 60 and a gate 32 braced to the floor as at 33, and along the edges of the floor are furnished staples 34 adapted to receive the lower ends of the racks 35 used for carrying stock, such as hogs or sheep, while these racks may be replaced by side boards for the transportation of loose material such as corn or the like. In the floor 18 are secured a number of staples 37 in which may be fastened means for holding a rope 41 to be used for securing a load.

It will now be evident that the wagon will be able to carry loads of a considerable weight over any kind of ground, as the wheels 21 and 29 cannot possibly sink down very deep in soft or muddy ground as the runners 20 will immediately take the weight off the wheels, and, being over twenty feet in length, it is evident that the load is distributed over considerable area of ground instead of the comparatively short and narrow surface of the wheel tires.

If the vehicle is used on snow covered ground entirely, it is an easy matter to detach the wheels from the vehicle, as they, in this case, are found to be unnecessary. The tapering of the runners will, in that case, facilitate the turning of the vehicle whether running on ice or snow.

It has been found that this kind of vehicle is of great use for hauling feed to large numbers of cattle on a ranch, and it is similarly useful to haul hogs and sheep from the ranches to the farm, particularly as the vehicle is very roomy and the cattle do not have to be crowded and will not be hot as the racks are used on the sides permitting the circulation of air. The cattle may be still further protected from the hot rays of the sun by stretching canvas over the racks.

On account of the very low position of the wagon floor over the ground, the vehicle is also suitable for harvesting corn, and it will be very easy to throw the corn right on the floor of the vehicle. The latter will hold as much as one hundred bushels of corn without any racks or sidebars.

It is practically impossible to upset the vehicle on account of its great width and little height above the ground.

A suitable size for both the front and rear wheels is about thirty inches diameter and the wheels may be made of steel and have a four inch tire. The axles are preferably made of oak, and the rear axles provided with a skein carrying the axle arm, while the front axle has similar skeins constituting the bearings for the hinged axle arms or spindles.

Having thus described the invention, what is claimed as new is:

A vehicle comprising a platform, front and rear axletrees rigidly secured directly to the under side of the platform, runners rigidly secured to the under sides of the axletrees and extending the full length of the platform, wheels on the axletrees adjacent and at the outer sides of the runners, the tread surfaces of the wheels projecting below the tread surfaces of the runners, and filler pieces inserted between the runners and the platform and extending longitudinally of the runners with their ends abutting the axles whereby to furnish a firm support for the platform through the entire length of the same.

In testimony whereof I affix my signature.

WILBER E. YOUNG. [L. S.]